Sept. 18, 1951  V. J. JANDASEK  2,568,007
TRANSMISSION
Filed Oct. 29, 1945  2 Sheets-Sheet 1
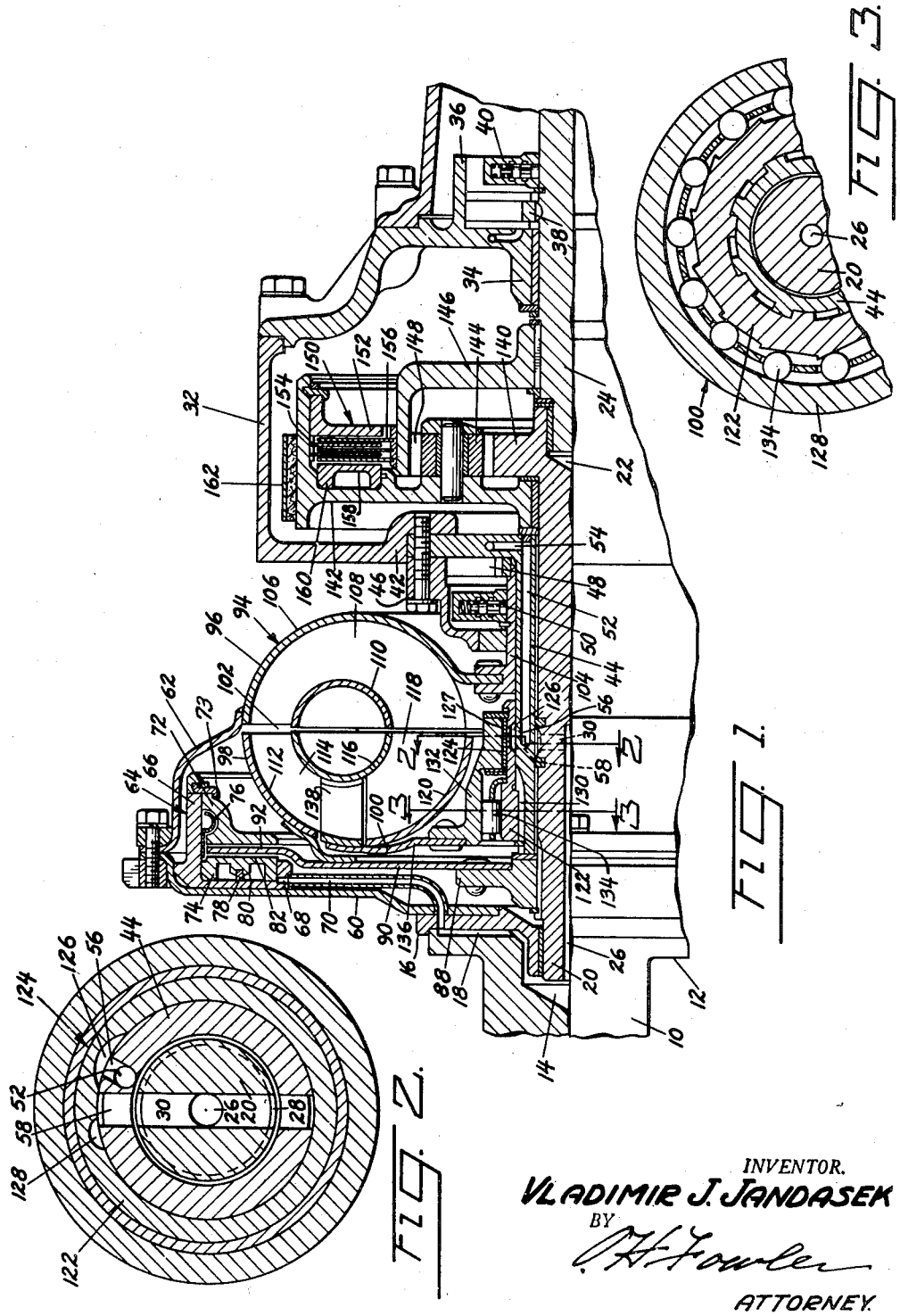
INVENTOR.
VLADIMIR J. JANDASEK
BY
ATTORNEY.

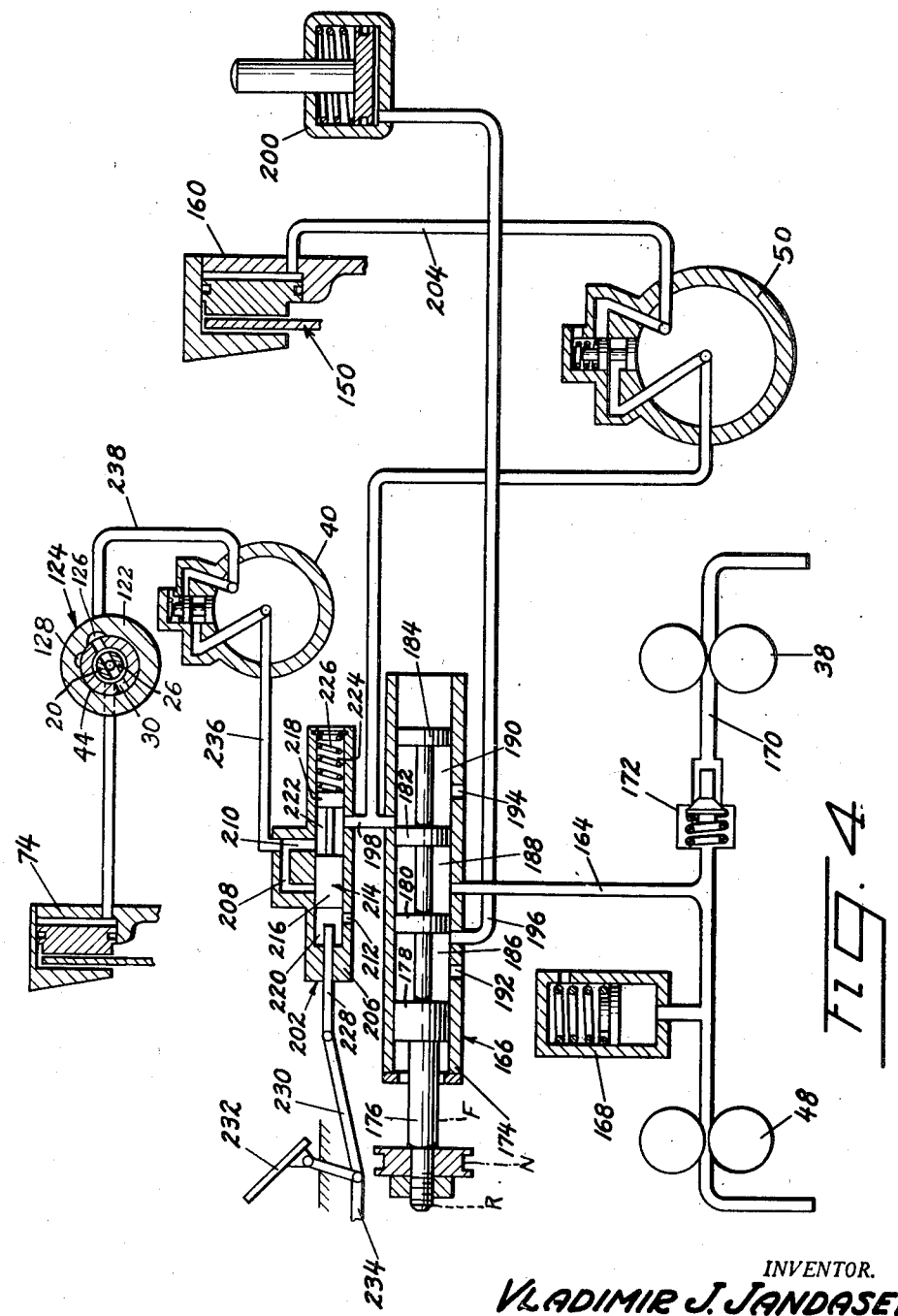

Patented Sept. 18, 1951

2,568,007

UNITED STATES PATENT OFFICE 2,568,007

TRANSMISSION

Vladimir J. Jandasek, Detroit, Mich., assignor to Bendix Aviation Corporation, Detroit, Mich., a corporation of Delaware Application October 29, 1945, Serial No. 625,306

9 Claims. (Cl. 74—732)

This invention relates to transmissions.

Broadly the invention comprehends a transmission having the equivalent of three speeds forward with full power transmission throughout the speed range.

An object of the invention is to provide a transmission including a fluid torque converter operative in all full throttle accelerations up to a predetermined speed, and in addition thereto the converter is operative during part throttle acceleration from stall and low speeds up to a speed ratio of approximately .675 between input and output.

Another object of the invention is to provide a transmission including a fluid torque converter, and a fluid actuated clutch automatically operative at a predetermined speed to effect a one-to-one drive.

Another object of the invention is to provide a transmission including a fluid torque converter having a reaction member movable in one direction and held against movement in the reverse direction, and a fluid actuated clutch controlled by movements of the reaction member.

Another object of the invention is to provide a transmission including a planetary gear system and fluid pressure means for control thereof.

Another object of the invention is to provide a transmission including a fluid torque converter, a planetary gear system, fluid actuated clutches and fluid pressure means for control of the transmission.

Another object of the invention is to provide a fluid pressure system for a transmission including pumps driven by the primer mover and the driven shaft.

A further object of the invention is to provide a transmission have a simple and yet effective means for the elimination of creep of the vehicle.

Other objects and advantages of the invention will appear from the following description when taken in connection with the drawings forming a part of this specification, and in which:

Fig. 1 is a vertical sectional view of a transmission embodying the invention;

Fig. 2 is a sectional view, substantially on line 2—2, Fig. 1;

Fig. 3 is a sectional view substantially on line 3—3, Fig. 1; and

Fig. 4 is a diagrammatical view of the fluid pressure system for control of the transmission.

Referring to the drawings for more specific details of the invention, 10 represents a primary member or a crankshaft of an internal combustion engine. The shaft has a flange 12 and an axial recess 14, and a hub 16 suitably secured to the flange provides in conjunction therewith an annular chamber 18 in direct communication with the recess 14.

A bearing fitted in the hub 16 receives a secondary member or a center shaft 20 having an axial recess 22 fitted with a bearing for the reception of a tertiary member or a driven shaft 24. The center shaft 20 has an axial passage 26 in direct communication with the recess 14, a circumferential groove 28, and a diametral passage 30 providing a communication between the axial passage 26 and the groove 28.

A stationary housing 32 has a concentrically disposed hub 34 fitted with a bearing for the reception of the driven shaft 24, and the hub has a flange 36 providing a suitable housing for a pump 38 connected to the driven shaft, and a governor 40 also connected to the driven shaft. The housing also has a hub 42 arranged in oppositely disposed relation to the hub 34, and the hub 42 supports a sleeve 44 fitted on the center shaft 20, also an auxiliary housing 46 for a pump 48 and a governor 50. The sleeve 44 has a passage 52 parallel to its axis; a radial port 54 providing a communication between the passage 52 and the pump 48; another radial port 56 communicating with the passage 52 and opening at the perimeter of the sleeve; and a passage 58 through the wall of the sleeve in communication with the groove 28 in the center shaft, the purpose of which will hereinafter appear.

The hub 16 supports a plate 60 having a flange, and a housing 62 is bolted or otherwise secured to the flange. A clutch indicated generally at 64 includes a cylinder 66 fixedly secured to the plate 60, and the cylinder has a port 68 connected as by a tube 70 to the annular passage 18. The outer wall of the cylinder is extended to provide a support for a clutch plate 72 overhanging the chamber of the cylinder, and the clutch plate 72 is secured against displacement as by a key 73. An annular piston 74 reciprocable in the chamber of the cylinder is normally held in retracted position by a spring 76 supported by the clutch plate 72. The piston is also held against rotation by pins 78 received by recesses in bosses 80 on the back of the piston head, and the face of the piston is machined to provide a clutch plate 82. A hub 88 splined to the center shaft 20 supports a disc 90 having a flange 92 positioned between the clutch plates 72 and 82 and rotatable relative thereto.

A fluid torque converter indicated generally at 94 includes an impeller 96, a two-stage turbine 98, and a reaction member 100 providing in conjunction with one another a fluid circuit 102.

The impeller includes an elongated hub 104 fitted on the sleeve 44 and extended into the auxiliary housing 46 for support and attachment of the pump 48 and the governor 50. The hub supports a web 106 having suitably secured thereon spaced blades 108 supporting an inner shroud 110.

The two-stage turbine 98 includes a web 112 suitably secured to the disc 90. The web has secured thereto spaced vanes 114 supporting an inner shroud 116, and the shroud has secured thereto spaced vanes 118 supporting a web 120. The vanes 114 constitute the first stage of the turbine, and the vanes 118 constitute the second stage of the turbine.

A sleeve 122 mounted on the sleeve 44 for limited angular movement relative thereto provides a valve indicated generally at 124. The sleeve has a slot 126 adapted to straddle the port 56 and the passage 58 so as to establish communication therebetween. A bearing 127 fitted tightly on the sleeve 122 supports the reaction member 100. The sleeve also has a slot 128 adapted to register with the passage 58 so as to establish a communication between the passage 58 and a fluid return passage 130.

The reaction member includes a hub 132 supported on the bearing 127 for free rotation in one direction and held against rotation in the reverse direction by a one-way brake 134 interposed between the hub and the sleeve 122. The hub has thereon a web 136 supporting spaced reaction vanes 138 in the fluid circuit 102 between the first and second stages of the turbine.

A planetary gearing system enclosed in the housing 32 includes a sun gear 140 on the center shaft 20. A drum 142 mounted for free rotation on the center shaft has thereon spaced planet pinions 144 in mesh with the sun gear 140, and a drum 146 keyed to the driven shaft 24 has on its flange an orbit gear 148 in mesh with the pinions. A clutch indicated generally at 150 includes a plate 152 fixedly secured to the back of the flange of the drum 142, and a plurality of axially movable plates 154 carried by the flange of the drum and interleafed with a plurality of axially movable plates 156 carried by the flange of the drum 146. Means for actuating the clutch includes an annular cylinder 158 on the drum 142 and a piston 160 reciprocable in the cylinder, and means for holding the drum 142 against movement includes a brake 162 and fluid pressure actuated means for applying the brake.

A fluid pressure system for control of the transmission includes a suitable source of fluid, not shown, the fluid pressure pump 48 connected thereto and driven directly by the prime mover, the fluid pressure pump 38 connected to the source of fluid and driven by the driven shaft 24. The outlet of the pump 48 is connected by a conduit 164 to a manually actuated valve indicated generally at 166, and an accumulator 168 is connected in the conduit 164. The outlet of the pump 38 is connected by a conduit 170 to the conduit 164, and a check valve 172 is connected in the conduit 170.

The manually actuated valve 166 includes a cylinder 174 and a piston 176 reciprocable therein having four spaced lands 178, 180, 182 and 184 providing therebetween spaced chambers 186, 188 and 190 adapted to communicate, upon reciprocation of the piston within its limits, with discharge ports 192 and 194 and also with conduits 164, 196 and 198. The conduit 196 connects the cylinder 174 to a fluid pressure actuated motor 200 for applying the brake 162. The conduit 198 connects the cylinder 174 to a slide valve indicated generally at 202 and also to the governor 40 which in turn is connected by a conduit 204 to the chamber of the cylinder 160 of the fluid pressure means for actuating the clutch 150.

The slide valve 202 includes a cylinder 206 having two spaced ports 208 and 210, and another port 212 adapted to be connected to the sump. A piston 214 reciprocable in the cylinder has spaced lands 216 and 218 providing chambers 220, 222 and 224 adapted to communicate upon reciprocation of the piston within its limits with the ports 208, 210, 212 and the conduit 198. The chamber 224 has therein a spring 226 for returning the piston to its retracted position. A piston rod 228 mounted for reciprocation in the head of the cylinder is adapted to actuate the piston after a predetermined movement, and the rod is connected by a suitable linkage 230 to an accelerator pedal lever 232 which in turn is connected by a rod 234 to the carburetor of the prime mover.

The ports 208 and 210 of the valve 202 are connected by a conduit 236 to the governor 50, which in turn is connected by a conduit 238 to the valve 124 for control of the flow of fluid to the cylinder 74 of the clutch 64.

The valve 124 includes the sleeve 122 movable angularly under the influence of the reaction member to on and off positions. When in the on position, the oppositely disposed slots 126 in the sleeve 122 register with the radial passage 58 in the sleeve 44, and when in the off position the slots 128 register with the passage 58 and a return passage 130 leading to the fluid circuit.

In a normal operation, power flows from the crankshaft 10 of the prime mover through the plate 60 and housing 62 to the impeller 96, causing rotation thereof with a resultant energization of the fluid in the circuit 102. The energy of the fluid is received on the vanes 114 and 118 of the first and second stages of the turbine and also on the vanes 138 of the reaction member 100, resulting in moving the reaction member to a stationary position and driving the turbine with a resultant transmission of force to the center shaft 20 with torque multiplication; and the power flows from the center shaft through the mechanical transmission locked by the clutch 150 for rotation as a single unit, to the driven shaft 24.

The clutch 150 is applied when the piston 176 is shifted to the forward or right hand position in Fig. 4 wherein the conduit 198 is placed in communication with the fluid supply line 164. Fluid under pressure flows to the governor 50 which opens at a pre-determined engine speed so that fluid may pass to the cylinder 158 and apply the clutch 160 and this clutching action locks the planetary gear system for rotation as a single unit.

Upon attaining a predetermined speed where torque multiplication is no further required, the direction of fluid flow changes and the fluid impinges on the back of the vanes 138 of the reaction member 100 with a resultant movement of the reaction member and disengagement thereof from the one-way brake 134, whereupon the reaction member is free to float in the circuit. This movement of the reaction member causes a limited angular movement of the sleeve 122 relative to the sleeve 44, and this movement of the sleeve 122 opens the valve 124 to admit the flow of fluid from the conduit 238 to the clutch 64. Upon attaining a higher speed, the governor 40 becomes effective to automatically release the flow of fluid to the valve 124 through which fluid passes to the chamber of the cylinder 74 resulting in actuation of the clutch 64 to effectively lock the driving shaft 10 to the center shaft 20 for direct drive.

When in direct drive, should it be found desirable or necessary to return to the torque conversion stage, the operator quickly depresses the foot pedal lever 232. This results in shifting the piston 214 so as to cover port 210 and place port 208 in communication with the sump. This releases pressure on the fluid in cylinder 74 to effect a disengagement of the clutch 64 and thereby establishes cooperation between the impeller 96, the turbine 98 and the reaction member 100 so as to again provide for the transmission of power with torque multiplication to the center shaft.

When it is desired to reverse the direction of travel, the piston 176 is manually shifted to the reverse or left hand position in Fig. 4 so as to release pressure on fluid in the cylinder 158. The fluid returns from the cylinder through conduit 204 and governor 50 to the chamber 190 and thence to the sump through port 194. Upon disengaging clutch 150 so as to unlock the planetary gear system, fluid under pressure is simultaneously admitted to the servomotor 200 through the chamber 188 and conduit 196. The pressurized fluid actuates the servomotor 200 so as to apply the brake 162 to the drum. This results in holding the carrier for the pinions 44 so as to cause operation of the planetary gear system at a slow speed reverse drive.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A transmission comprising primary and secondary members, a clutch connected therebetween, a fluid pressure actuated element for control of the clutch, a fluid torque converter including primary, secondary and reaction elements connected between the primary and secondary members, a fluid pressure system connected to the fluid pressure actuated element, a valve connected in the system for control of the flow of fluid to the fluid pressure actuated element, said valve being under control of the reaction element, and means responsive to the speed of the primary member connected in the system for control of the flow of fluid to the valve.

2. A transmission comprising primary and secondary members, a clutch connected therebetween, a fluid pressure system, a fluid pressure actuated unit connected in the system for control of the clutch, a valve connected in the system for control of the flow of fluid to the unit, a fluid torque converter connected between the primary and secondary members having an element adapted to control the valve and speed responsive means connected in the fluid system and driven by the primary member for control of the flow of fluid to the valve.

3. A transmission comprising a primary and a secondary member, a clutch connected between the primary and secondary members, a fluid pressure actuated unit for control of the clutch, a fluid torque converter connected between the primary and secondary members, a fluid pressure system connected to the fluid pressure actuated unit, a valve connected in the system for control of the flow of fluid to the unit, said valve being under control of one element of the torque converter, and a speed governor connected in the system and driven by the primary member for controlling the flow of fluid to the valve.

4. In a transmission, a primary, a secondary and a tertiary member, a clutch connected between the primary and secondary members, a fluid pressure actuated unit for control of the clutch, a fluid torque converter connected between the primary and secondary members, a planetary gear system, including planet pinions and a carrier therefor, connected between the secondary member and the tertiary member, a clutch for locking the planetary gear system, a fluid pressure actuated unit for control of the clutch, a brake for holding the carrier of the planet pinions of the planetary gear system, a fluid pressure unit for actuating the brake, a fluid pressure system connected to the fluid pressure actuated units, a valve connected in the fluid pressure system for control of the flow of fluid to the unit for actuating the clutch between the primary and secondary members, a speed responsive means connected in the fluid pressure system and driven by the primary member for control of the flow of fluid to the valve, a speed responsive means driven by the tertiary member for control of the flow of fluid to the actuating unit of the clutch for the planetary gear system, and means connected in the fluid pressure system for control of the flow of fluid to the fluid pressure actuated unit for the brake.

5. In a transmission, primary, secondary, and tertiary members, a clutch connected between the primary and secondary members operative to effect a one-to-one drive ratio therebetween, a torque converter connected between the primary and secondary members, a planetary gear system, including planet pinions and a carrier therefor, connected between the secondary and tertiary members, a clutch for locking the planetary gear system, a brake for holding the carrier of the planet pinions of the planetary gear system, a fluid pressure system connected to the clutches and to the brake, a valve connected in the fluid pressure system for control of the flow of fluid to the clutch between the primary and secondary members, said valve being under control of one element of the torque converter, a speed responsive means connected in the system and driven by the primary member for control of the flow of fluid to the valve, a speed responsive means connected in the fluid pressure system and driven by the tertiary member for control of the flow of fluid to the clutch of the planetary gear system, and a manually actuated valve connected in the system for control of the flow of fluid to the brake for the planetary gear system.

6. In a transmission, a primary, a secondary, and a tertiary member, a clutch operative to couple the primary and secondary members to effect a one-to-one drive ratio therebetween, a fluid pressure actuated unit for applying the clutch, a fluid drive connected between the primary and secondary members operative in one phase as a torque converter to transmit power with torque multiplication and in another phase as a fluid coupling, a planetary gear system, including planet pinions and a carrier therefor, connected between the secondary and tertiary members and operative in one phase to rotate as a single unit connecting the secondary and tertiary members and in another phase to reverse the direction of the drive, a clutch for locking the planetary gear system, a fluid actuated unit for applying the clutch of the planetary gear system, a brake for holding the carrier of the pinions of the planetary gear system, a fluid pressure system connected to the units, a valve connected in the fluid pressure system for control of the flow of fluid to the clutch between the primary and secondary members, means interposed between the fluid drive and valve effective to open the valve when the fluid drive is operated as a fluid coupling at substantially a one-to-one drive ratio, a speed responsive means connected in the fluid pressure system and driven by the primary member for control of the flow of fluid to the valve for actuating the clutch between the primary and secondary members, a speed responsive means connected in the fluid pressure system and driven by the tertiary member for control of the flow of fluid to the clutch of the planetary gear system and a manually actuated valve connected in the system for control of the flow of fluid to the unit for applying the brake.

7. In a transmission, primary, secondary and tertiary members, a fluid pressure actuated clutch connected between the primary and secondary members operative to effect a one-to-one drive ratio therebetween, a fluid drive connected between the primary and secondary members, a mechanical transmission, including a sun gear, planet pinions and a ring gear, connected between the second and tertiary members, a fluid pressure actuated clutch for locking the mechanical transmission, a fluid pressure system connected to the fluid pressure actuated clutches, a valve connected in the system for control of the flow of fluid to the clutch of the primary and secondary members, said valve being under control of one element of the fluid drive, means responsive to the speed of the primary member connected in the fluid system and operative to control the flow of fluid to the valve, means responsive to the speed of the tertiary member connected in the system for controlling the flow of fluid to the clutch of the mechanical transmission and a manually controlled valve connected in the system for controlling fluid actuated means for holding the carrier for the pinions of the mechanical transmission.

8. In a transmission, primary, secondary and tertiary members, a clutch connected between the primary and secondary members operative to effect a one-to-one drive ratio therebetween, a fluid pressure actuated unit for control of the clutch, a fluid drive connected between the primary and secondary members, and a mechanical transmission connected between the secondary and tertiary members, a fluid pressure system connected to the fluid pressure actuated unit including a plurality of pumps adapted to supply fluid under pressure and an accumulator connected between the pumps, a manually actuated slide valve connected between the pumps, a fluid actuated brake for the mechanical transmission connected to the slide valve, a spring loaded valve connected to the slide valve, manual means for actuating the spring loaded valve, a fluid actuated clutch for locking the mechanical transmission connected in the system between the slide valve and a spring loaded valve, and means connected in the system between the spring loaded valve and the clutch for control of the flow of fluid to the valve.

9. In a transmission, primary, secondary and tertiary members, a clutch connected between the primary and secondary members operative to effect a one-to-one drive ratio therebetween, a fluid pressure unit for actuating the clutch, a fluid drive connected between the primary and secondary members, a mechanical transmission, including a sun gear, planet pinions and an orbit gear, connected between the secondary and tertiary members, a fluid pressure system connected to the fluid pressure unit, fluid supply means carried by the primary and tertiary members for the delivery of fluid under pressure into the system, means for maintaining a pressure on the fluid in the system, a manually actuated slide valve connected in the system, a fluid pressure actuated brake for holding the carrier of the planet pinions connected to the slide valve, a spring loaded valve connected to the slide valve manual means for actuating the spring loaded valve, a valve connected in the system for control of the flow of fluid to the clutch between the primary and secondary members, said valve being under control of the fluid drive, a fluid pressure actuated clutch for locking the mechanical transmission connected in the fluid system between the slide valve and the spring loaded valve, a speed responsive means driven by the primary member and connected in the system through the spring loaded valve for control of the flow of fluid to the valve controlling the flow of fluid to the clutch between the primary and secondary members, and speed responsive means driven by the tertiary member and connected in the system for controlling the flow of fluid to the clutch of the mechanical transmission.

VLADIMIR J. JANDASEK.

REFERENCES CITED

The following references are of record in the file of this patent:

UNITED STATES PATENTS

| Number | Name | Date |
| --- | --- | --- |
| 1,960,705 | Kochling | May 29, 1934 |
| 2,093,236 | Dodge | Sept. 14, 1937 |
| 2,106,423 | DeLavaud | Jan. 25, 1938 |
| 2,120,896 | Koeppen | June 14, 1938 |
| 2,184,606 | DeLavaud | Dec. 26, 1939 |
| 2,351,483 | Carnagua | June 13, 1944 |
| 2,372,817 | Dodge | Apr. 3, 1945 |
| 2,373,122 | LaBrie | Apr. 10, 1945 |
| 2,480,933 | Jandasek | Sept. 6, 1949 |